United States Patent [19]

Millard

[11] Patent Number: 5,794,736
[45] Date of Patent: Aug. 18, 1998

[54] FLUID CONTROL SYSTEM FOR A VEHICLE POWER ASSISTED STEERING MECHANISM

[75] Inventor: Barry John Millard, Reading, England

[73] Assignee: Adwest Engineering Ltd., United Kingdom

[21] Appl. No.: 624,482

[22] PCT Filed: Sep. 28, 1994

[86] PCT No.: PCT/GB94/02113

§ 371 Date: May 30, 1996

§ 102(e) Date: May 30, 1996

[87] PCT Pub. No.: WO95/09758

PCT Pub. Date: Apr. 13, 1995

[30] Foreign Application Priority Data

Oct. 6, 1993 [GB] United Kingdom .................. 9320596

[51] Int. Cl.⁶ .................................................. B62D 5/06
[52] U.S. Cl. .................. 180/423; 180/417; 91/375 A; 91/450
[58] Field of Search ................... 180/421, 422, 180/423, 417; 91/449, 450, 375 R, 375 A

[56] References Cited

U.S. PATENT DOCUMENTS

| | | | |
|---|---|---|---|
| 4,619,339 | 10/1986 | Futaba et al. | 180/423 |
| 4,819,545 | 4/1989 | Dymond | 180/423 |
| 5,121,807 | 6/1992 | Adams | 180/423 |
| 5,152,359 | 10/1992 | Emori et al. | 180/422 |
| 5,184,693 | 2/1993 | Miller | 180/423 |
| 5,291,963 | 3/1994 | Sangret | 180/423 |
| 5,293,954 | 3/1994 | Dymond | 180/423 |
| 5,332,055 | 7/1994 | Emori et al. | 180/422 |

FOREIGN PATENT DOCUMENTS 2 249 070  4/1992  United Kingdom .

*Primary Examiner*—Daniel G. DePumpo
*Attorney, Agent, or Firm*—Finnegan, Henderson, Farabow, Garrett & Dunner

[57] ABSTRACT

A fluid control system (10) for a vehicle power steering mechanism having a manually driven steering member and a fluid driven driving member (16) operatively connected to steering means of the vehicle by which steerage of the vehicle is achieved, the control system (10) including a first valve (12) for metering pressurised fluid flow to the fluid operated driving member (16) in response to the force required to move the steering means when operating the manually driven steering member, the first valve (12) including at least two independent metering valve means (170, 171) each of which are simultaneously operated by the steering member to meter fluid flow to and/or from the fluid operated driving member (16) at a predefined rate, at least one of the metering valve means (170, 171) communicating independently to a drain via a second valve (14), the second valve (14) being arranged to selectively connect and disconnect said at least one of said valve means (170, 171) to the drain in response to vehicle speed.

6 Claims, 4 Drawing Sheets

FLUID CONTROL SYSTEM FOR A VEHICLE POWER ASSISTED STEERING MECHANISM

The present invention relates improvements to a fluid control system for a vehicle power assisted steering mechanism.

Power steering mechanisms for automobiles are known which comprise a manually driven steering member, commonly a steering wheel, and a fluid driven driving member, commonly a double acting hydraulic piston and cylinder assembly, which are operatively connected to the steering means, e.g. the road wheels, by which steerage of the vehicle is achieved.

The steering wheel is drivingly connected to a metering valve which is responsive to the load required to move the road wheels so as to meter flow of pressurised fluid to the hydraulic piston and cylinder assembly in order to vary the pressure of fluid supplied for operating the piston.

Such a power steering mechanism is shown for example in our UK patent 1299506.

It is recognized that the degree of power assistance required for rotating the steering wheel varies with speed of the vehicle. A known proposal is to locate a speed responsive metering valve in the flow path for varying the metered pressure of fluid produced by the load responsive metering valve.

However, the power assistance characteristics required differs at high speed to those at low speed and so the metering characteristics of the metering valve driven by the steering wheel are chosen to provide an optimum range of metering values for both high and low speed power assistance. This range of metering values is a compromise between the ideal ranges of metering values for high speed power assistance and for low speed power assistance and is not compensated by the speed responsive metering valve.

It is a general aim of the present invention to provide a fluid control system for a vehicle power steering mechanism which provides improved power assistance response at high and low speeds.

According to one aspect of the present invention there is provided a fluid control system for a vehicle power steering mechanism having a manually driven steering member and a fluid driven driving member operatively connected to steering means of the vehicle by which steerage of the vehicle is achieved, the control system including a first valve for metering pressurised fluid flow to the fluid operated driving member in response to the force required to move the steering means when operating the manually driven steering member, the first valve including at least two independent metering valve means each of which are simultaneously operated by the steering member to meter fluid flow to and/or from the fluid operated driving member at a predefined rate, each metering valve means communicating independently to a drain via a second valve, the second valve being arranged to selectively connect and disconnect at least one of said valve means to the drain in response to vehicle speed.

Various aspects of the present invention are hereinafter described with reference to the accompanying drawings, in which.

The fluid control system 10 according to the present invention is hereinafter described incorporated in a power assisted steering mechanism of the type described in our UK patent 1299506. Basically, such a system includes a load responsive metering valve which is manually driven by the driver of the vehicle via a steering wheel. The metering valve includes a valve rotor rotatably housed within a valve sleeve. The opposed faces of the rotor and sleeve have longitudinally extending grooves which cooperate to control flow of fluid through the valve depending upon the relative displacement of the rotor and sleeve.

The steering mechanism includes a rack connected to the steering road wheels of the vehicle and a pinion is mechanically connected to the rotor and sleeve of the load responsive valve. The system hereinafter is described in use with a rack and pinion mechanism, however, it must be appreciated that other mechanisms may be employed, for example, a worm and roller steering gear. The rotor and sleeve are mechanically linked by a torque rod so that rotation of the steering wheel causes the pinion to be driven via the valve rotor, sleeve and torque rod. Under no load conditions there is no angular displacement between the rotor and sleeve. However, the greater the load for driving the pinion, the greater the relative displacement between the sleeve and rotor.

The mechanism further includes a double-acting fluid driven piston and cylinder assembly connected to the rack. Fluid which is controlled by the load responsive metering valve is fed to the piston and cylinder assembly in a proportion determined by the amount of relative displacement between the valve rotor and sleeve to thereby drive the rack and reduce the load on the pinion.

Figure 1:
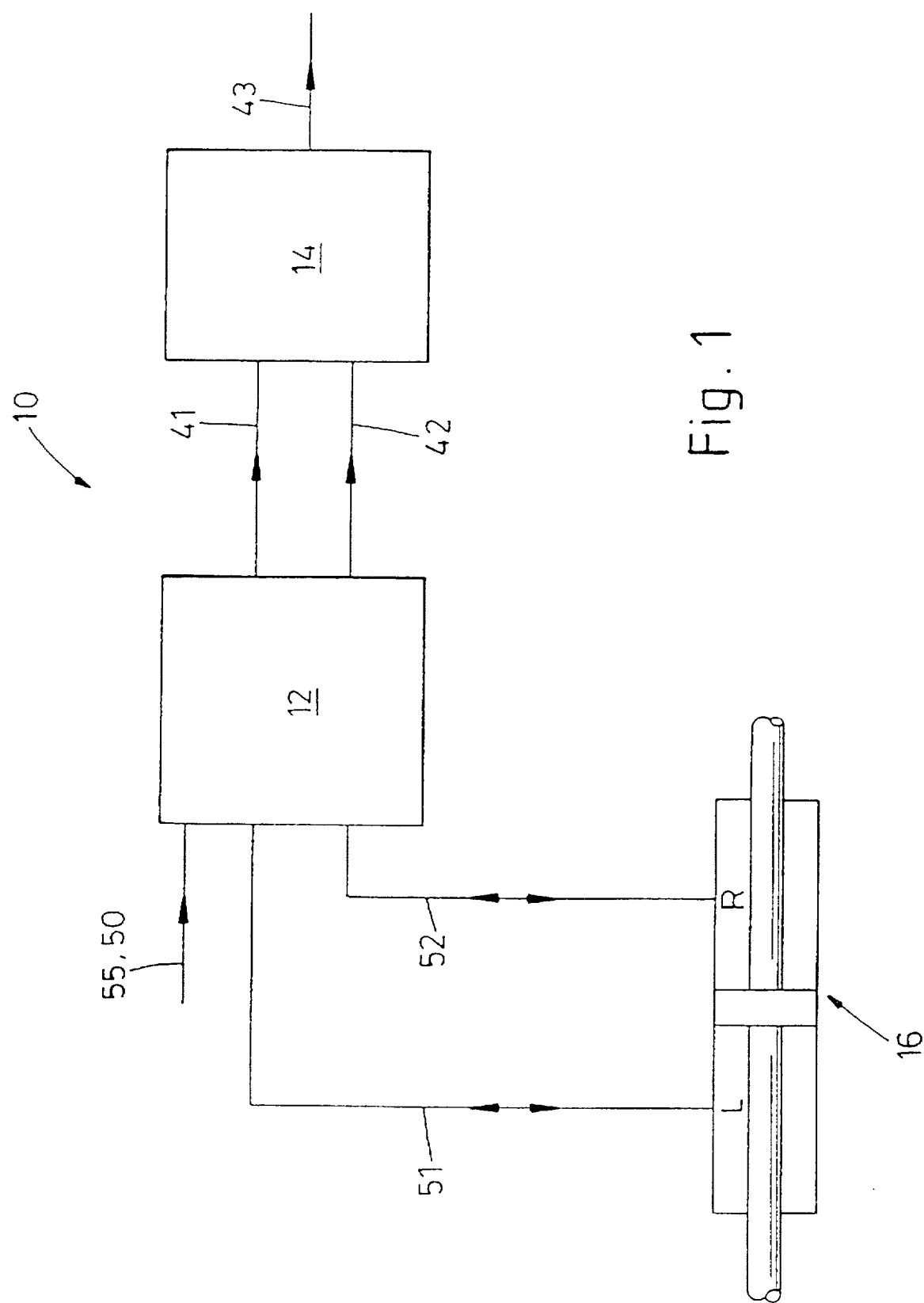
FIG. 1 is a schematic diagram of a fluid control system according to one embodiment of the present invention.

In accordance with the present invention, the fluid control system 10, shown in FIG. 1, includes a first valve in the form of a load responsive valve 12, and a second valve in the form of a speed responsive valve 14. The valve 12 controls supply of pressurised fluid to a piston and cylinder assembly 16 which is drivingly connected to the steering road wheels and the valve 14 controls return of fluid from the valve 12 to drain. The two valves 12,14 may be formed as separate units or may be integrated into one main valve housing forming a single unit.

The load responsive valve 12 is adapted to selectively supply and control the rate of driving fluid delivered to a left and/or a right hand side of the piston and cylinder assembly 16. The load responsive valve 12 communicates with the left and/or right hand side of the piston and cylinder assembly 16 via feed/return conduits L and R respectively. The flow directions along conduits L and R are opposite to one another during operation of the steering wheel (i.e. one is pressurised and the other is vented).

Pressurised fluid is fed to the valve 12 along conduit 55 and fluid returning to drain is fed along two drain return conduits 41, 42 which communicate with the speed responsive valve 14. The speed responsive valve 14 feeds fluid travelling along conduits 41,42 into a common drain conduit 43 to enable fluid returning from the load responsive valve 12 to flow to drain and be returned to source.

Figure 2:
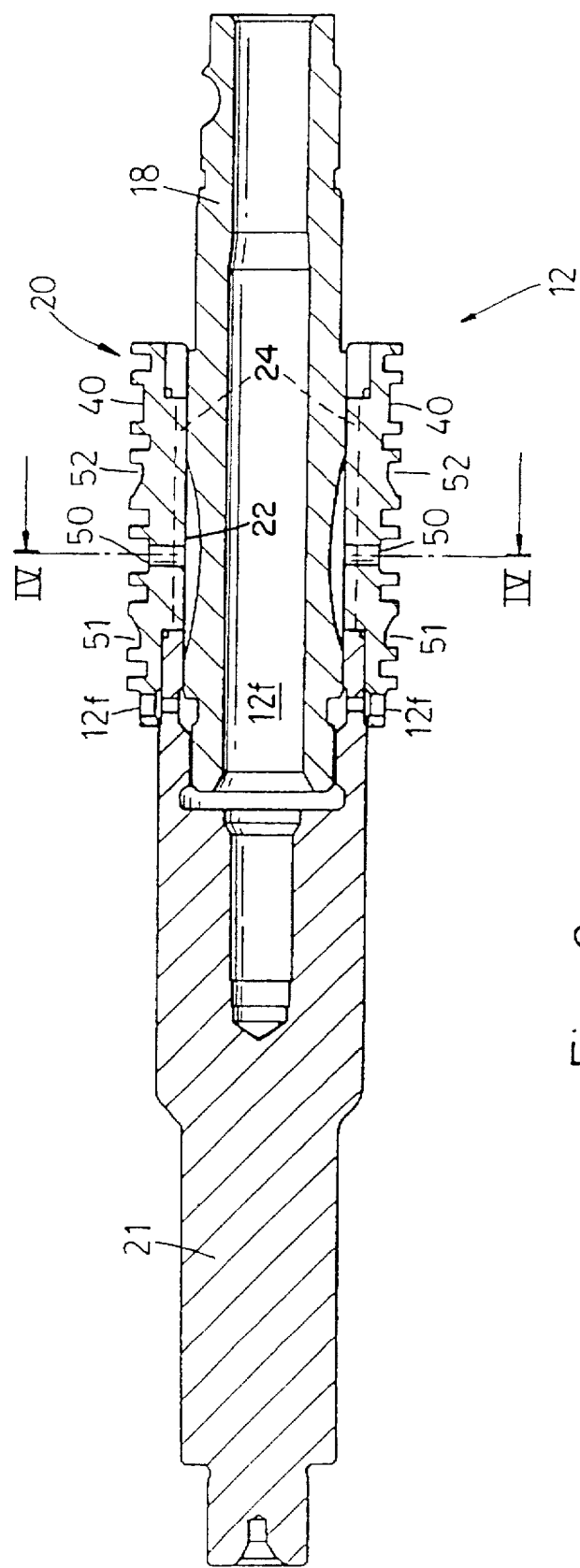
FIG. 2 is an axial section through a load responsive metering valve for use in the system of FIG. 1.

The load responsive valve 12 is preferably of the type shown in FIG. 2 including a relatively displaceable valve rotor 18 and sleeve 20 mechanically connected to a pinion 21 for driving engagement with a steering rack (not shown).

Figure 3:
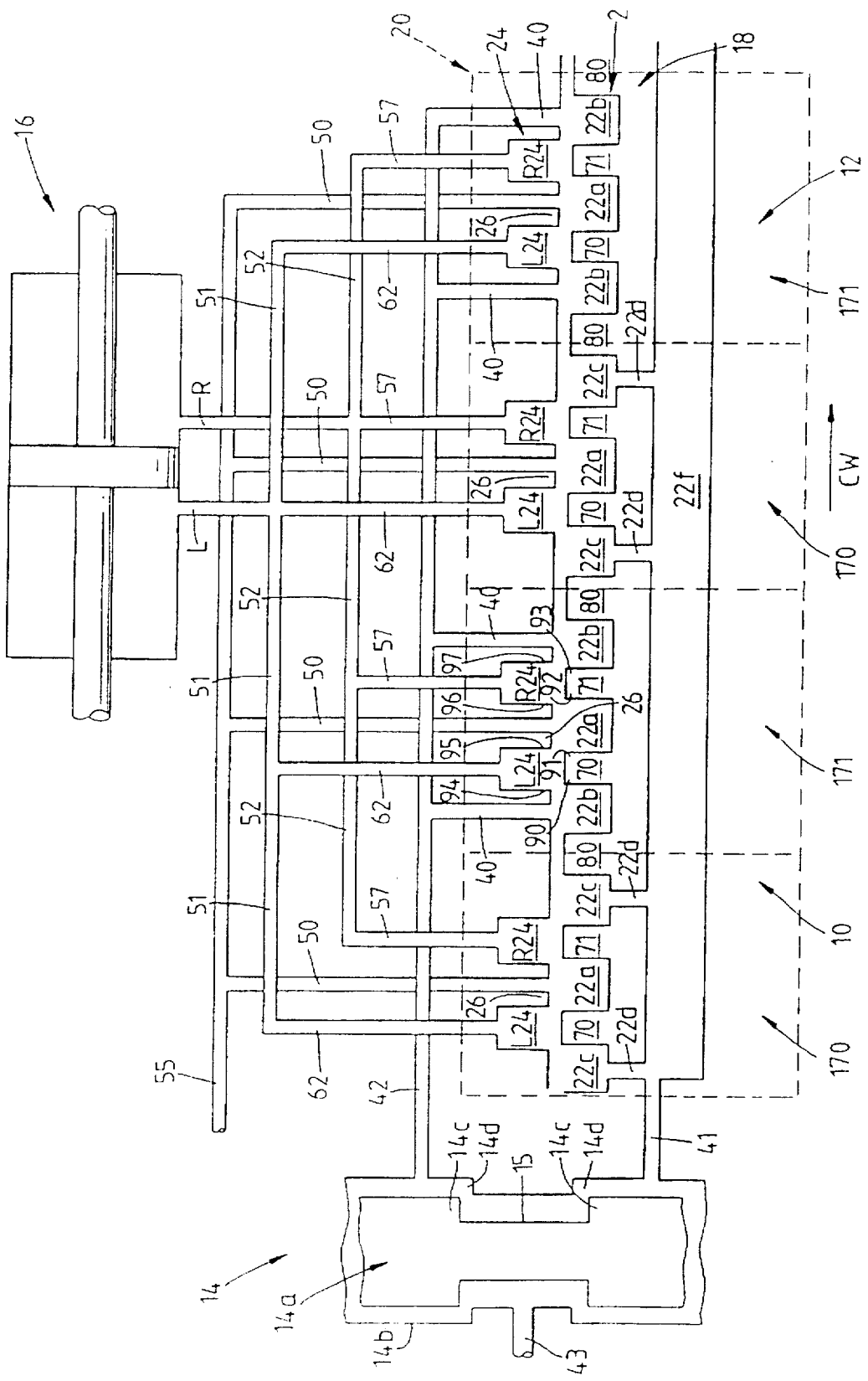
FIG. 3 is a more detailed diagram of the system shown in FIG. 1.
Figure 4:
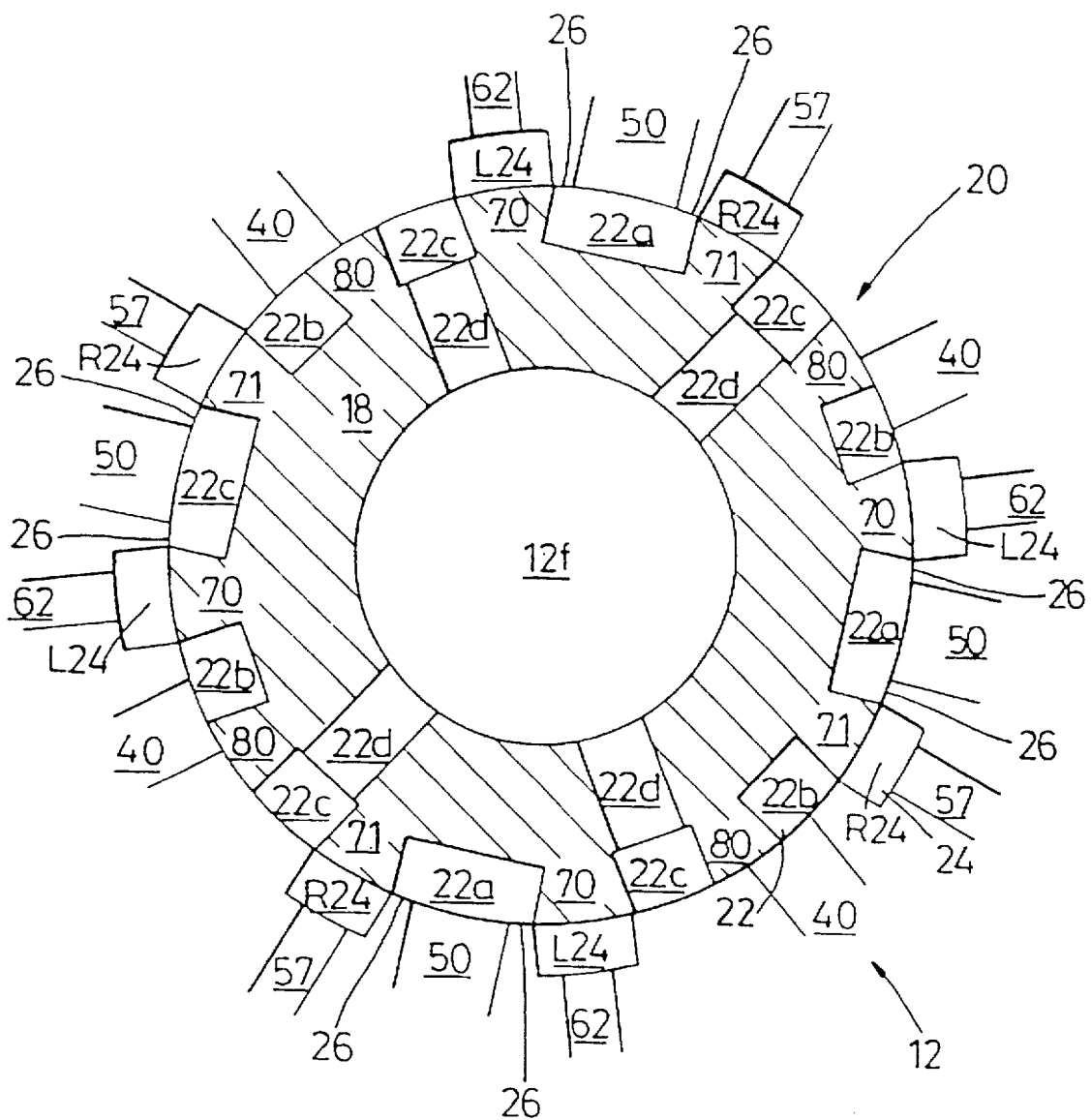
FIG. 4 shows a section through IV of FIG. 2.

Accordingly the load responsive valve 12 includes a plurality of longitudinally extending flow control channels 22 spaced about an outer periphery of the rotor 18 which co-operate with corresponding flow control channels 24 spaced about the inner periphery of sleeve 20. This is shown in FIG. 4 and is shown schematically in FIG. 3 which shows a graphic development of the rotor 18 and sleeve 20.

In the embodiment shown, the co-operating flow control channels 22, 24 of the load responsive valve 12 are arranged to define two independent metering valves comprising a pair of first valves 170 and a pair of second valves 171. Each valve 170, 171 communicates with the fluid supply conduit 55 via conduits 50 and with the piston and cylinder assembly 16 via two conduits 51, 52 connected respectively to the conduits L and R. Each valve 170 communicates with the drain return conduit 41 via conduits 22d, 22f and each valve 171 communicates with the drain return conduit 42 via conduits 40.

In the embodiment shown the valves 170, 171 of the load responsive valve 12 are spaced apart by 90° alternately about the periphery of the sleeve 20 and rotor 18. Each valve 170, 171 has a pair of control channels L24, R24 communicating with conduits 51,52 via branch conduits 62, 57 respectively and so all valves 170, 171 are on common communication with conduits L and R. However, the valves 170 and 171 communicate independently with the return drain conduits 41 and 42 respectively. In this respect, the control channels 22c of the valves 170 communicate with conduits 22d and the control channels 22b communicate with conduits 40.

Disposed between each pair of control channels L24, R24 is a land 26 through which a branch conduit 50 passes for feeding fluid into an opposed control channel 22a in the rotor 18. Either side of the control channel 22a is a pair of lands 70, 71 each being opposed to the control channels L24, R24 respectively. The valves 170, 171 are separated by lands 80.

The pair of lands 70, 71 located either side channels 22a of each valve 170, 171 have side edges 90, 91, 92 and 93 respectively which cooperate with edges 94, 95, 96 and 97 of channels L24 and R24 facing the lands 70, 71 respectively. The co-operating edges are adapted to meter the flow of fluid from channel 22a into channels L24, R24 of both valves 170, 171 and return channels 22c, 22b of each respective valve 170, 171.

Operation of valve 12 in so far as determining supply of metering pressurised fluid to the left or right of the assembly 16 is basically the same as that outlined in our UK Patent 1299506.

In summary if there is relative movement between the rotor 18 and the sleeve 20 pressurised fluid would flow from channel 22a to either L24 or R24 of valves 170, 171 for delivery of fluid to the left or right hand side of the piston and cylinder assembly 16 whilst simultaneously venting the opposite channel R24 or L24 through the respective return port 22b and 22c of each valve 171, 170 respectively. If there is no relative movement between the rotor 18 and sleeve 20 pressurised fluid is allowed to flow equally into channels L24, R24 of both valves 170, 171 and into channels 22c, 22d. This position is illustrated in FIG. 3 and accordingly no pressurised fluid is directed into either conduits 51 or 52 and so the piston and cylinder assembly 16 is not driven. Preferably the metered edges of the lands 70, 71 are of the same size and shape to provide the same metering performance for each valve 170 and 171. This enables the outputs from both valves 170, 171 to be blended in a smooth manner since the pressure v. displacement curves for both valves 170,171 are the same and thereby the combined curve will be of a similar shape. Preferably the pressure v. displacement curves for each valve 170,171 is substantially linear. Alternatively, non-linear curves may be adapted in desired circumstances. However it is envisaged that the metered edges in valves 170 may be different to those in valves 171 in order to gain a different desired flow characteristic output from valve 170 and 171 respectively.

The amount of fluid flow along the drain return conduits from each valve 170, 171 is controlled. In order to vary the degree of power assistance provided at different vehicle speeds for a given amount of angular displacement between the rotor 18 and sleeve 20.

This control is achieved using the speed responsive valve 14.

In the embodiment shown, the speed responsive valve 14 includes an axially movable valve spool 14a housed in a valve body 14b. The valve spool 14a has an annular channel 14a. In the embodiment shown the valve body includes two intake ports one being connected to conduit 41 and the other connected to conduit 42 and one fluid exhaust port connected to conduit 43. The spool 14a regulates the flow of fluid through the speed responsive valve 14 from conduits 41, 42 to conduit 43 in dependence on the axial position of the valve spool 14a. The spool 14a preferably includes an annular channel 15 having metered edges 14c for co-operation with metered edges 14d about the inner periphery of the body 14b.

As illustrated the spool 14a is located in a central or rest position and in this position provides equal, preferably unrestricted, communication between conduits 41, 42 and conduit 43.

In this condition, return flow from both valves 170 and 171 is unrestricted and so both valves 170, 171 can operate to supply/return fluid to the assembly 16 and thereby provide a maximum amount of power assistance throughout the range of relative angular displacement of the rotor 18 and sleeve 20.

In order to provide a minimum amount of power assistance throughout the range of relative angular displacement of the rotor 18 and sleeve 20 the valve spool 14a is moved axially to a closed position whereat it closes off or at least throttles to a predetermined amount fluid flowing from conduit 41. When at the closed position, valve 170 cannot return fluid to drain and so effectively does not supply pressurised fluid to the assembly 16. Preferably, the movement of the valve spool 14a between its rest position and closed position is progressive so as to provide a smooth transition in phasing in or out valves 170. Movement of the valve spool 14a may be achieved by conventional means such as a solenoid which is progressively operated in response to vehicle speed.

Accordingly for low speed manoeuvres requiring maximum power assistance, such as parking, the valve spool 14a would be located at its rest position and as the vehicle speed increases it will be progressively moved to its closed position in order to reduce the amount of power assistance available.

In the preferred embodiment the metered edges in all valves 170, 171 are the same and so the metering of the return flow achieved by the speed responsive valve enables the fluid pressure to change in a linear manner when phasing in/out the valves 170.

It will be appreciated that instead of phasing in/out valves 170 it would be possible as an alternative to phase in/out valves 171.

It will also be appreciated that any speed responsive valve arrangement may be used in order to perform the phasing in/out of valves 170 or 171.

It will also be appreciated that only one of the valves 170 or 171 may be connected to a speed responsive valve for controlling of flow of fluid therethrough with the other valve being permanently connected to the drain.

I claim:

1. A fluid control system of a vehicle power steering mechanism having a manually driven steering member and a fluid operated member operatively connected to steering means of the vehicle by which steerage of the vehicle is achieved, the control system including a first valve for metering pressurized fluid flow to the fluid operated driving member in response to force required to move the steering means when operating the manually driven steering member, the first valve including at least two independent metering valves each of which are simultaneously operated by the steering member to meter fluid flow selectively to and from the fluid operated driving member at a predefined rate, at least one of the two independent metering valves communicating independently to a drain via a second valve, the second valve being arranged to selectively connect and disconnect said at least one of said two independent metering valves to the drain in response to vehicle speed.

2. A fluid control system according to claim 1, wherein the first valve includes a first valve member drivingly connected to the manually driven steering member and a second valve member drivingly connected to the steering means, the first and second valve members being relatively displaceable in response to said force required to move the steering means and including metering means for the two independent metering valves such that said relative displacement of the first and second valve members throughout a predetermined range of said relative displacement causes the metered flow through the two independent metering valves to change simultaneously.

3. A fluid control system according to claim 2 wherein the first valve member comprises a cylindrical valve rotor and the second valve member comprises a stator in which the rotor is rotatably housed, with opposed surfaces of the rotor being rotatably housed, the opposed surfaces of the rotor and opposed surface of the stator including a first group of longitudinally extending grooves for defining one of said two independent metering valves and a second group of longitudinally extending grooves for defining another of said two independent metering valves, the grooves of each of said first group and said second group having cooperating side edges on the rotor and the stator which define metering means for metering fluid flow with respect to both of said two independent metering valves.

4. A fluid control system according to any of claims 1 to 3, wherein the second valve is operative to connect said two independent metering valves to drain below a predetermined vehicle speed and to disconnect at least one of the two independent metering valves to drain above said predetermined vehicle speed.

5. A fluid control system according to claim 4, wherein the second valve is operative to progressively disconnect said at least one of said two independent metering valves over a range of vehicle speeds, a lower limit of said range being defined by said predetermined vehicle speed and an upper limit of said range being defined by a higher predetermined vehicle speed.

6. A fluid control system according to claim 5, wherein the second valve is a solenoid operated valve.

* * * * *